July 4, 1933.    R. PARRISH    1,916,488
ELECTRIC LEAD CONNECTER
Filed July 2, 1931
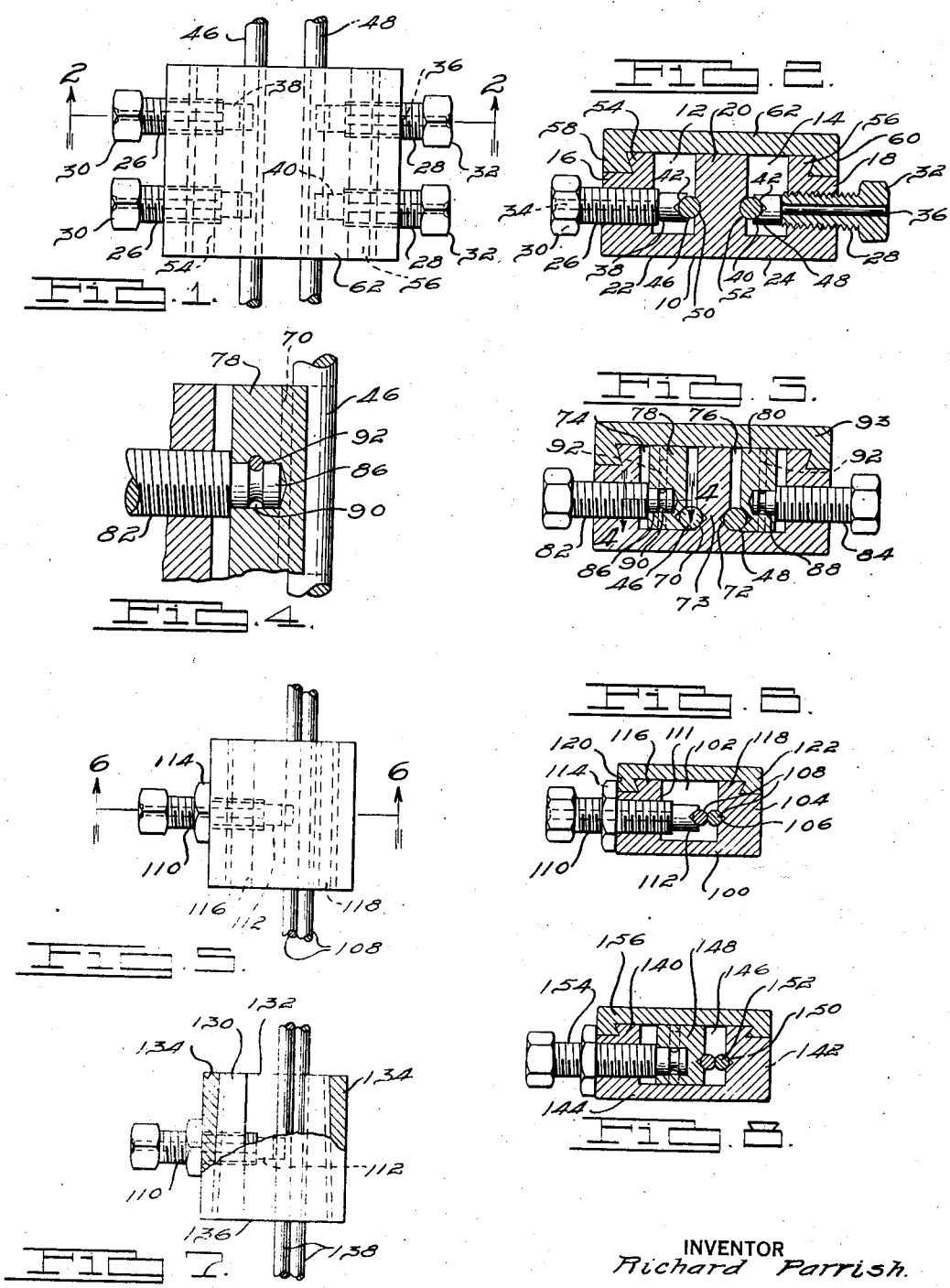
INVENTOR
Richard Parrish.
BY
Harness, Dickey, Pierce & Haun
ATTORNEYS.

Patented July 4, 1933

1,916,488

UNITED STATES PATENT OFFICE

RICHARD PARRISH, OF DETROIT, MICHIGAN, ASSIGNOR TO JOHN A. BEDFORD, OF DETROIT, MICHIGAN

ELECTRIC LEAD CONNECTER

Application filed July 2, 1931. Serial No. 548,314.

This invention relates to devices for interconnecting cables and it has particular relation to devices employed for interconnecting cables employed as electrical conductors. The invention has for its main objects the provision of a connecter device which is highly efficient in operation, a device offering low resistance to flow of electrical current, a device which may be installed with a minimum expenditure of labor and time; the provision of a cable connecter which positively maintains its grip upon the cables which are to be united; the provision of a device which securely grips any sizes of cables; the provision of a cable connecter structure which is provided with a cover which may readily be secured in position but in which the cover is securely locked when the device is operating as a clamp for the cable portions which are being united; the provision of a device of the above indicated character which may be manufactured at a minimum of expense; the provision of a cable connecter having a cover in which clamping of the cables also causes the cover to be clamped.

Heretofore in securing together cables such as are employed as conductors of electricity it has been customary to bring the cables into proximity or even into contacting and interwound relation with respect to each other and then to secure them together by means of solder. This method of securing cables was objectionable in many respects of which the following are a few.

The operation of soldering is a comparatively technical process and in order to obtain satisfactory results the operator must have a considerable degree of skill. This fact has necessitated the employment of comparatively expensive labor. Also, unless the surfaces to be united were very carefully cleaned and the temperatures employed in conducting the operation were very carefully controlled the unions obtained were comparatively poor and in the cases of some materials employed as conductors it was almost impossible to obtain a satisfactory bond between the solder employed and the cable to which it was applied. In addition such connections are usually required to be made outdoors where the wind seriously interferes with the soldering operation unless a temporary enclosure is used, and which is both inconvenient and expensive. Furthermore, the electrical resistance of solder is comparatively high and as a result soldered joints offered comparatively high resistance to the transmission of electrical current. In order to obviate the defects of the solder connection it has heretofore been proposed to substitute mechanical clamping devices for uniting electrical conductors. However, the devices heretofore proposed have not proven satisfactory either because of the expense of manufacture or because they were not sufficiently rugged and permanent in operation. This invention contemplates the provision of a mechanical clamp in which the difficulties heretofore encountered are obviated.

For a better understanding of the invention reference may now be had to the accompanying drawing attached hereto and forming a part of the specification, in which:

Figure 1 is a plan view of a cable connecter device embodying the principles of the invention.

Figure 2 is a cross-sectional view taken substantially upon the line 2—2 of Figure 1.

Figure 3 is a cross-sectional view of a slightly modified form of the invention as disclosed in Figure 1.

Figure 4 is a fragmentary cross-sectional view taken substantially upon the line 4—4 of Figure 3.

Figure 5 is a plan view of an additional form of the applicant's generic invention.

Figure 6 is a cross-sectional view taken substantially upon the line 6—6 of Figure 5.

Figure 7 is a view partially in elevation and partially in cross section of an additonal form of the applicant's invention.

Figure 8 is a cross-sectional view disclosing a further modification of the structure as disclosed in Figure 7.

In the form of the invention as disclosed in Figures 1 and 2 a connecter body 10 of copper, bronze or other conducting metal is formed with longitudinally extending channels 12 and 14 having side walls 16 and 18 and a separating partition 20 and with webs 22 and 24 interconnecting the side walls 16 and 18 with the intermediate partition and thus providing bottoms for the channels 12 and 14. Pairs of screws 26 and 28 extend inwardly through the respective side wall portions 16 and 18 into the channels 12 and 14 and are provided with heads 30 and 32 of hexagonal or other convenient cross-sectional contour. These screws are longitudinally bored to receive journal pins 34 and 36 of clamping blocks 38 and 40. The blocks, in turn, are transversely grooved, as indicated at 42, non-rotatably to engage cables or electrical conductors 46 and 48 which are to be electrically united. If desired, the lateral faces of the intermediate partition 20 of the body 10 may also be grooved as indicated at 50 and 52 to provide a greater bearing surface for the cables 46 and 48.

In order to provide a cover for the channels 12 and 14 and also to prevent possible bending of the web portions 22 and 24 and a resultant movement of the clamping members 38 and 40 away from the conductors 46 and 48, the upper edges of the side portions 16 and 18 may be provided with dovetailed guide flanges 54 and 56, that mate with corresponding flanges 58 and 60 along the outer margin of a cover member 62 which is adapted to be slid longitudinally upon the body member or portion 10. The flanges thus provide means for positively preventing bending of the intermediate webs 22 and 24 under the stress exerted by the screws 26 and 28.

If desired, as shown in connection with the slightly modified form of the invention illustrated in Figure 7, to be later described, the outer faces of the flanges 54 and 56 may be disposed in slightly tapering relation with respect to each other, whereby to secure film engagement with the corresponding flanges 58 and 60 upon the cover member 62, when the latter is in operative position. It is apparent that by driving the cover longitudinally by means of a hammer or some other convenient instrumentality the flanges 58 and 60 may be caused firmly to grip the corresponding flanges 54 and 56.

In the operation of the embodiment of the invention disclosed in Figs. 1 and 2 cables 46 and 48 are merely disposed within the grooves 50 and 52 and the cover slid into position after which the screws 26 and 28 are rotated to bring the clamping members 38 and 40 into engagement with the conductors 46 and 48. It will be observed that the screws and the clamping members are free to rotate with respect to each other, thus permitting the clamping members to move into engagement with the conductors without corresponding rotational movement. Firm engagement, as previously stated, may be obtained between the guides 54, 58 and 56, 60 merely by driving the cover 62 into position. Where a freely slidable cover is desired, engagement between the guides may be obtained by rotating the screws 26 and 28 to force the side wall portions 16 and 18 slightly apart and correspondingly to bend the web portions 22 and 24.

In the form of the invention as disclosed in Fig. 3, cable receiving grooves 70 and 72 are formed in a partition 73 immediately adjacent to the bottoms of the longitudinally extending channels 74 and 76 corresponding to the channels 12 and 14 described in the previously discussed embodiment of the invention. Cables 46 and 48 are clamped in these channels by means of cross-heads 78 and 80 which are operated by means of adjusting screws 82 and 84. These screws at their inner ends are provided with bearing portions 86 and 88 which, as best shown in Figure 4, are peripherally grooved as indicated at 90 to receive a pin 92 extending transversely through the cross-head 80. These pins positively lock the bearing portion 86 in the corresponding bearing in cross head in such manner as to prevent longitudinal displacement of the bearing portion from the bearing while permitting relative rotation of the bearing portion within the bearing. The channels are closed by a cover 93 corresponding to cover 62.

The operation of this embodiment of the invention is self evident. The cables are merely disposed within the channels 70 and 72 and the cover is slid into position after which the screws 82 and 84 are rotated to cause the cross head 80 to clamp the conductors in position and also to spread the guide flanges upon the body to clamp the cover.

In the forms of the invention as disclosed in Figures 1 to 4 inclusive the partitions 20 and 73 provide extensive areas of contact with the cables, and also short and highly conductive paths between the cables. The embodiment disclosed in Figure 3 is perhaps to be preferred because the relatively long cross heads 80 provide a greater area of contact for cables and because of their length insure that the cables will contact firmly with the partitions throughout their length.

In the form of the invention as disclosed in Figures 5 and 6, a body portion 100 composed of copper or other suitable alloy or metal is formed with a single cable receiving channel 102, a side wall portion 104 of which is grooved as indicated at 106 to receive a pair of cables 108 in contacting relation with respect to each other. The cables may be clamped into engagement with each other and also into the groove 106 by means of a screw 110 threaded through side wall portion 111 and having a relatively rotatable clamping member 112 corresponding to the members 38 and 40 as disclosed in Figure 2, upon the end thereof. If desired, the screw may further be provided with a lock nut 114 contacting with the outer face of portion 111. However, this element is optional.

The side wall portions 104 of the member 100 are formed along their upper edges with dovetail guides 116 and 118 corresponding to the guides which have previously been described in connection with Figures 1 and 2. The guides 116 and 118 further mate with corresponding guides 120 and 122 which interlock with the guides upon the side walls of the channel 102.

The invention as disclosed in Figure 7 is in all respects similar to that disclosed in Figures 5 and 6 except that, as indicated in the drawing, guides 130 upon the upper edges of the side walls of a body portion 132 are slightly tapered whereby to provide a wedging fit against the inner faces of corresponding flanges 134 upon the lower face of a cover member 136. After cables 138 have been disposed in position, with this embodiment of the invention the cover 136 is slid upon the flanges 130 and is driven home by the application of sufficient force to obtain a desired wedging action between the flanges 130 and the flanges 134. The screws may then be tightened to enhance the binding action between the cover guides and the flanges and also to clamp the cables.

In the form of the invention disclosed in Figure 8 a channel-like body portion having side walls 140 and 142 which are interconnected by a web 144 has a channel 146 which receives a cross-head 148. This crosshead and the adjacent side wall portion 142 are grooved as indicated at 150 to receive the conductors 152 and the crosshead is operated by means of a screw structure 154 which is identical in design with that described in connection with the screw 82 as disclosed in Figures 3 and 4. The channel may be closed by means of a closure member 156 which is identical in design with that disclosed in Figure 6.

From the foregoing description it will be apparent that my invention contemplates the provision of a cable conductor which is simple in design and which may be applied by relatively unskilled operators at a minimum of expenditure of time and labor. By reason of the provision of the interfitting dovetail flanges upon the upper edges of the side walls of the body portions of the clamping members and upon the lower face of the cover members it is impossible for the side walls of the body portion to spread and thus permit loosening of the contact between the portion of the surface of the connecter which engage the surfaces of the cables and the corresponding surfaces of the latter members.

Although I have described only the preferred embodiments of the invention, it will be understood that the invention is not limited to these specific forms but that various modifications and changes may be made therein without departure from the spirit of the invention or the scope of the appended claims.

I claim:

1. A connecter for electrical conductors comprising a body member provided with a channel extending throughout its length, the channel being open for the lateral insertion therein of an electrical conductor, a screw extending through the side of the body member for actuating the block to clamp the conductor between the block and the side of the member opposite said first mentioned side, and a slidable cover comprising marginal flanges connected by a web for limiting relative lateral movement of a margins of the sides of said member adjacent the open side of said channel.

2. A connecter for electrical conductors comprising a body member provided with a channel extending throughout its length, the channel being open for the lateral insertion therein of an electrical conductor, a screw extending through one side of the member for clamping the conductor against the remaining side and a cover for the channel comprising portions interlocking with the upper edges of the member adjacent the open side of the channel to limit outward deflection of said edges.

3. A connecter for electrical conductors comprising a body member provided with a channel extending throughout its length, the channel being open for the lateral insertion therein of an electrical conductor, a block laterally movable within the channel, a screw extending through the one side of the member for actuating the block to clamp an electrical conductor between the block and the first remaining side of the channel and a cover for the channel, the edges of the member adjacent the open side of said channel and the cover having dovetail portions slidably interfitting for limiting outward deflection of said edges.

4. A connecter for electrical conductors comprising a body member provided with an open channel, a screw extending through a lateral side of the body member into the channel and adapted to clamp an electrical conductor against the opposite side of the member, said body member having dovetail guides formed longitudinally thereof adjacent the outer edges of the walls of said channel and a cover slidable upon the guide, the cover having mating guides engaging with the first mentioned guides, one set of said guides being so tapered as to provide a wedging fit upon longitudinal movement of the cover upon the body member.

5. A connecter for electrical conductors comprising a body member provided with a pair of longitudinally extending open channels, a partition disposed between said channels, screws extending through the outer lateral sides of the member and adapted to clamp electrical conductors against said intermediate partition, a cover member having guides formed along the edges thereof and engaging corresponding guides along the upper edges of the outer lateral sides of said member, the guides being dovetailed and tapered whereby to provide wedging fits for preventing displacement of the cover.

RICHARD PARRISH.